US011993243B2

(12) United States Patent
Kawamata

(10) Patent No.: US 11,993,243 B2
(45) Date of Patent: May 28, 2024

(54) CONTROL APPARATUS FOR ALL-WHEEL DRIVE VEHICLE

(71) Applicant: TOYOTA JIDOSHA KABUSHIKI KAISHA, Toyota (JP)

(72) Inventor: Atsushi Kawamata, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/465,257

(22) Filed: Sep. 12, 2023

(65) Prior Publication Data
US 2024/0140391 A1 May 2, 2024

(30) Foreign Application Priority Data

Nov. 1, 2022 (JP) ................. 2022-175871

(51) Int. Cl.
| B60W 10/119 | (2012.01) |
| B60W 10/12 | (2012.01) |
| B60W 10/184 | (2012.01) |
| B60W 10/02 | (2006.01) |

(52) U.S. Cl.
CPC .......... *B60W 10/119* (2013.01); *B60W 10/12* (2013.01); *B60W 10/184* (2013.01); *B60W 10/024* (2020.02); *B60W 2510/1005* (2013.01); *B60W 2520/06* (2013.01); *B60W 2520/10* (2013.01)

(58) Field of Classification Search
CPC .. B60W 10/12; B60W 10/119; B60W 10/184; B60W 10/024; B60W 10/04; B60W 10/14; B60W 2510/1005; B60W 2520/06; B60W 2520/10; B60W 2520/403; B60W 30/18109; B60W 30/188
See application file for complete search history.

(56) References Cited

U.S. PATENT DOCUMENTS

| 9,889,831 | B2 * | 2/2018 | Yasui ................. B60T 8/172 |
| 2004/0158377 | A1 * | 8/2004 | Matsumoto .......... B62D 15/025 |
| | | | 701/70 |
| 2010/0036566 | A1 | 2/2010 | Hayami |

(Continued)

FOREIGN PATENT DOCUMENTS

| JP | 2010-38051 A | 2/2010 |
| JP | 2018-47877 A | 3/2018 |

*Primary Examiner* — Edwin A Young
(74) *Attorney, Agent, or Firm* — Oblon, McClelland, Maier & Neustadt, L.L.P.

(57) ABSTRACT

A control apparatus for an all-wheel drive vehicle that includes (i) a power source, (ii) a power distribution device for distributing a power from the power source to front and rear wheels, (iii) a differential limiting mechanism for placing the power distribution device in a differential limiting state in which a rotational difference between the front wheels and the rear wheels is limited, and (iv) a braking device for applying a wheel braking torque to each of the front and rear wheels. When the power distribution device is placed in the differential limiting state and the wheel braking torque is applied to each of the front wheels and the rear wheels, a torque limiting control is executed for setting an upper limit value of a torque of the power source to a smaller value when the wheel braking torque is large than when the wheel braking torque is small.

5 Claims, 4 Drawing Sheets

(56) References Cited

U.S. PATENT DOCUMENTS

| | | | |
|---|---|---|---|
| 2012/0303236 A1* | 11/2012 | Andonian | B60T 8/175 |
| | | | 701/83 |
| 2018/0086202 A1 | 3/2018 | Arai | |
| 2022/0219677 A1* | 7/2022 | Hwang | B60W 40/114 |
| 2022/0227354 A1* | 7/2022 | Hagiwara | B60T 8/1755 |

* cited by examiner

CONTROL APPARATUS FOR ALL-WHEEL DRIVE VEHICLE

This application claims priority from Japanese Patent Application No. 2022-175871 filed on Nov. 1, 2022, the disclosure of which is herein incorporated by reference in its entirety.

FIELD OF THE INVENTION

The present invention relates to a control apparatus for an all-wheel drive vehicle in which a power from a power source is distributed to front wheels and rear wheels.

BACKGROUND OF THE INVENTION

There is well known a control apparatus for an all-wheel drive vehicle that includes (i) front wheels, (ii) rear wheels, (iii) a power source, (iv) a power distribution device configured to distribute a power from the power source to the front wheels and the rear wheels, (v) a differential limiting mechanism configured to place the power distribution device in a differential limiting state in which a rotational difference between the front wheels and the rear wheels is limited, and (vi) a braking device configured to apply a wheel braking torque to each of the front wheels and the rear wheels. For example, a four-wheel drive vehicle described in Patent Document 1 is such a vehicle. Patent Document 1 discloses that, when a predetermined condition is satisfied, the power distribution device is placed in the differential limiting state.

PRIOR ART DOCUMENT

Patent Document

[Patent Document 1]
Japanese Patent Application Laid-Open No. 2018-47877

SUMMARY OF THE INVENTION

The vehicle may be in a state in which all the wheels or the rear wheels are likely to slip due to a condition of a road surface such as a rough road. On the other hand, brake characteristics of the vehicle are generally set such that the wheel braking torque of the front wheels is larger than the wheel braking torque of the rear wheels. Therefore, when the wheel braking torque is applied to the wheels and a driving torque generated by the power source is transmitted to the wheels under the above-described situation with the power distribution device being placed in the differential limiting state, the driving torque of the rear wheels may become larger than the wheel braking torque to the rear wheels, so that the rear wheels may slightly slip. Thus, in the differential limiting state of the power distribution device, a high torque is applied to the power transmission path to the front wheels, rotation of which is stopped by the wheel braking torque, so that there is a risk that durability of the power transmission path to the front wheels could be reduced. To cope with such a phenomenon, it is conceivable to limit the torque of the power source, for example. However, if the torque of the power source is uniformly limited, a power performance of the power distribution device in the differential limiting state is reduced, and there is a possibility that an appropriate drive torque could not be ensured when the vehicle runs under the above-described situation or when the vehicle runs on an uphill road.

The present invention has been made in view of the above circumstances, and an object thereof is to provide a control apparatus for an all-wheel drive vehicle capable of suppressing a reduction in durability of a power transmission path to front wheels while ensuring a power performance in a differential limiting state of a power distribution device.

According to a first aspect of the present invention, there is provided a control apparatus for a vehicle that includes (i) front wheel, (ii) rear wheels, (iii) a power source, (iv) a power distribution device configured to distribute a power from the power source to the front wheels and the rear wheels, (v) a differential limiting mechanism configured to place the power distribution device in a differential limiting state in which a rotational difference between the front wheels and the rear wheels is limited, and (vi) a braking device configured to apply a wheel braking torque to each of the front wheels and the rear wheels. The control apparatus is configured, when the power distribution device is placed in the differential limiting state and the wheel braking torque is applied to each of the front wheels and the rear wheels, to execute a torque limiting control for setting an upper limit value of a torque of the power source to a smaller value when the wheel braking torque is large than when the wheel braking torque is small.

According to the first aspect of the invention, when the power distribution device is placed in the differential limiting state and the wheel braking torque is applied to each of the front wheels and the rear wheels, the torque limiting control is executed such that the upper limit value of the torque of the power source is set to a smaller value when the wheel braking torque is large than when the wheel braking torque is small. Thus, for example, when a large accelerator operation and a large brake operation are executed in the differential limiting state of the power distribution device, the torque of the power source is likely to be limited, so that a high torque is unlikely to be transmitted to a power transmission path to the front wheels. Further, for example, in the differential limiting state of the power distribution device, when the brake operation is gradually reduced and the accelerator operation is gradually increased, the limitation of the torque of the power source is gradually released, so that the torque of the power source is increased in a state in which the rear wheels are unlikely to slightly slip. Therefore, in the differential limiting state of the power distribution device, it is possible to suppress reduction in durability of the power transmission path to the front wheels while ensuring the power performance.

DETAILED DESCRIPTION OF PREFERRED EMBODIMENT

In the embodiment of the present invention, a gear ratio (that is the same in meaning as a speed ratio) in the above-described step-variable transmission or transmission is defined as "rotational speed of input rotary member/rotational speed of output rotary member". When a low gear position, i.e., a low running-speed gear position is established in the step-variable transmission or transmission, the step-variable transmission or transmission provides a high gear ratio. For example, the a lowest gear position is a lowest running-speed gear position. The low gear position of the step-variable transmission is a low running-speed gear position that provides the step-variable transmission with the high gear ratio, among a plurality of gear positions (that are the same in meaning as shift positions). For example, the lowest gear position of the step-variable transmission is a gear position providing a highest gear ratio, among the plurality of gear positions.

An embodiment of the present invention will be described in detail below with reference to the drawings.

Embodiment

Figure 1:
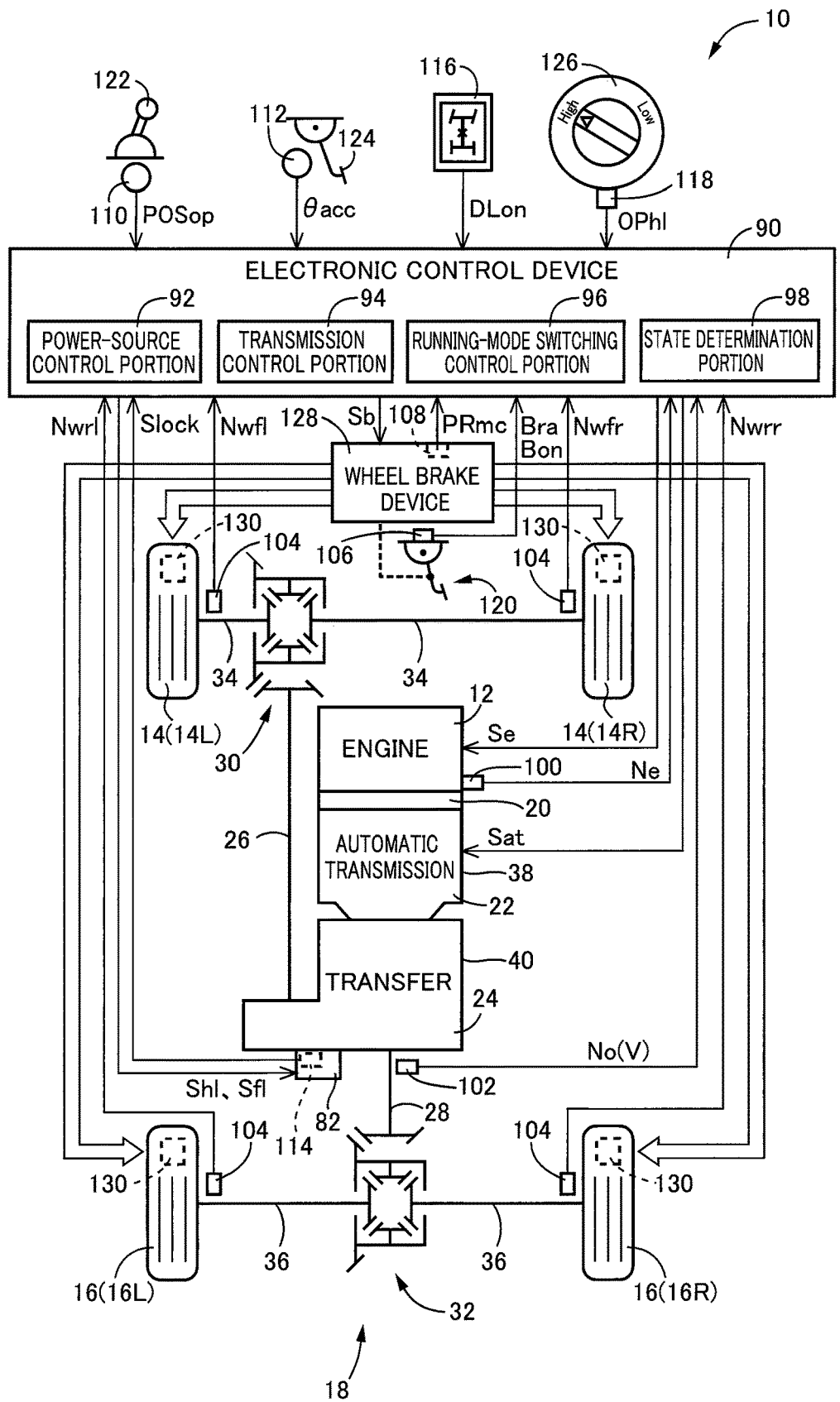
FIG. 1 is a view showing a schematic configuration of a vehicle to which the present invention is applied, and is a view showing a control function and a main part of a control system for various types of controls in the vehicle.

FIG. 1 is a view showing a schematic configuration of a vehicle 10 to which the present invention is applied, and is also a view showing a control function and a main part of a control system for various controls in the vehicle 10. As shown in FIG. 1, the vehicle 10 is an all-wheel drive vehicle including an engine 12 as a power source, front wheels 14 including left and right front wheels 14L and 14R, and rear wheels 16 including left and right rear wheels 16L and 16R. The vehicle 10 includes a power transmission device 18 configured to transmit a power from the engine 12 to each of the front wheels 14 and the rear wheels 16.

The engine 12 is a known internal combustion engine, and is to be controlled by an electronic control apparatus 90 such that an engine torque Te, which is a torque of the engine 12, is controlled by the electronic control apparatus 90.

The power transmission device 18 includes a torque converter 20, an automatic transmission 22, a transfer 24, a front propeller shaft 26, a rear propeller shaft 28, a front differential 30, a rear differential 32, a front drive shaft 34 and a rear drive shaft 36.

The automatic transmission 22 is, for example, a known planetary-gear-type automatic transmission. The automatic transmission 22 is a transmission provided between the engine 12 and the transfer 24. The automatic transmission 22 is to be controlled by the electronic control apparatus 90 so as to establish a selected one of a plurality of gear positions having respective different gear ratios γat. The gear positions of the automatic transmission 22 include forward gear positions and a reverse gear position Rev. Each of the forward gear positions is a gear position in which the gear ratio γ at is set to a forward gear ratio. For example, a lowest forward gear position, i.e., a first speed gear position 1st is a gear position in which the gear ratio γat is the highest among the plurality of forward gear positions. The reverse gear position Rev is a gear position in which the gear ratio γat is set to a reverse gear ratio.

The transfer 24 is connected to an output side of the automatic transmission 22. The transfer 24 is a power distribution device configured to distribute the power from the engine 12 to the front wheels 14 and the rear wheels 16.

Figure 2:
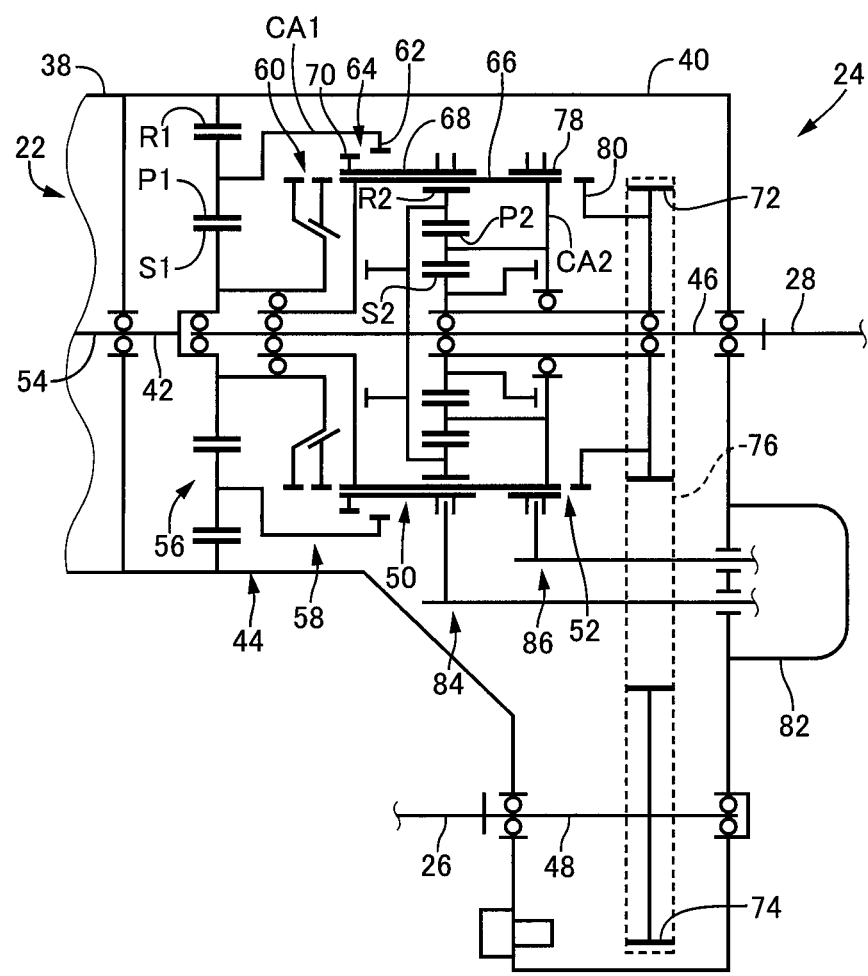
FIG. 2 is a schematic view showing a transfer included in the vehicle of FIG. 1.

FIG. 2 is a schematic view showing the transfer 24. As shown in FIG. 2, the transfer 24 includes a transfer case 40 serving as a non-rotating member connected to a vehicle rear side of a transmission case 38 (see FIG. 1) of the automatic transmission 22. The transfer 24 includes an input shaft 42, an auxiliary transmission 44, a first output shaft 46, a second output shaft 48, a center differential 50 and a differential lock mechanism 52 that are disposed in the transfer case 40.

The input shaft 42 is connected to an output shaft 54 of the automatic transmission 22, and is to be rotationally driven by power inputted from the engine 12 via the automatic transmission 22. The first output shaft 46 is connected to the rear propeller shaft 28. The second output shaft 48 is connected to the front propeller shaft 26.

The auxiliary transmission 44 includes a single-pinion-type planetary gear device 56 and a dog clutch mechanism 58 that is configured to establish a selected one of a low gear position L and a high gear position H.

The planetary gear device 56 includes a sun gear S1 connected to the input shaft 42, a ring gear R1 connected to the transfer case 40 and a plurality of pinions P1 meshing with the sun gear S1 and the ring gear R1, and a carrier CA1 rotatably and revolvably supporting a plurality of pinions. The dog clutch mechanism 58 includes a synchronous meshing mechanism 60 and a clutch gear 62. The synchronous meshing mechanism 60 is connected to the sun gear S1 and is involved in establishment of the high gear position H. The clutch gear 62 is connected to the carrier CA1 and is involved in establishing the low gear position L.

The dog clutch mechanism 58 includes, in addition to the synchronous meshing mechanism 60 and the clutch gear 62, a dog clutch 64 for establishing the low gear position L. The dog clutch 64 includes a cylindrical sleeve 68 which is unrotatable about an axis of the first output shaft 46 relative to a differential case 66 provided in the center differential 50 and which is movable in a direction of the axis of the first output shaft 46 relative to the differential case 66. The dog clutch 64 includes the clutch gear 62 that meshes with an outer peripheral teeth 70 provided on an outer peripheral portion of the sleeve 68.

In the auxiliary transmission 44, the sleeve 68 slides in the axial direction of the first output shaft 46 in the dog clutch mechanism 58 such that inner peripheral teeth of the sleeve 68 and the synchronous meshing mechanism 60 mesh with each other, whereby the high gear position H is established. Further, in the auxiliary transmission 44, the sleeve 68 slides in the axial direction of the first output shaft 46 in the dog clutch mechanism 58 such that the outer peripheral teeth 70 of the sleeve 68 and the clutch gear 62 mesh with each other, whereby the low gear position L is established. The auxiliary transmission 44 is a step-variable transmission that is provided in the transfer 24 and configured to transmit the power from the engine 12 to the front wheels 14 and the rear wheels 16 while changing the rotational speed of the engine 12.

The center differential 50 is a central differential device configured to distribute the power to the first output shaft 46 and the second output shaft 48 while allowing a rotational difference therebetween. The center differential 50 is a well-known torque-sensing-type differential limiting device. The center differential 50 includes the differential case 66, a ring gear R2, a sun gear S2 and a carrier CA2. The differential case 66 is supported by the first output shaft 46, and is rotatable about the axis of the first output shaft 46. The ring gear R2 is connected to the first output shaft 46. The sun gear S2 is supported by the first output shaft 46, and is rotatable relative to the first output shaft 46. The carrier CA2 rotatably and revolvably supports a plurality of pinions P2 meshing with the sun gear S2 and the ring gear R2, and are connected to the differential case 66.

The transfer 24 includes a drive sprocket 72, a driven sprocket 74 and a chain 76. The drive sprocket 72 is rotatably supported by the first output shaft 46, and is connected to the sun gear S2. The driven sprocket 74 is unrotatably connected to the second output shaft 48. The chain 76 is wound around the drive sprocket 72 and the driven sprocket 74. The rotation of the drive sprocket 72 is transmitted to the driven sprocket 74 via the chain 76.

When the vehicle 10 runs straight, the torque transmitted from the planetary gear device 56 to the differential case 66 is transmitted by the center differential 50 to the first output shaft 46 via the ring gear R2 and to the second output shaft 48 via the sun gear S2. When the rotational speed of the front wheels 14 is high, for example, when the vehicle 10 is turning, a differential-action limiting force is generated by a rotational speed difference between the sun gear S2 and the ring gear R2. As a result, for example, at a time of turning acceleration of the vehicle 10, a torque distribution to the front wheels 14 is made smaller than the torque distribution at a time of straight running of the vehicle 10.

The differential lock mechanism 52 places the transfer 24 into a center differential lock state in which a rotational difference between the first output shaft 46 and the second output shaft 48 is limited. That is, the differential lock mechanism 52 is a differential limiting mechanism configured to place the transfer 24 in a differential limiting state in which a rotational difference between the front wheels 14 and the rear wheels 16 is limited.

The differential lock mechanism 52 includes a sleeve 78 and a clutch gear 80. The sleeve 78 is unrotatable about the axis of the first output shaft 46 relative to the differential case 66 and which is movable in the direction of the axis of the first output shaft 46 relative to the differential case 66. The clutch gear 80 has outer peripheral teeth that mesh with inner peripheral teeth of the sleeve 78. The clutch gear 80 is disposed between the drive sprocket 72 and the differential case 66, and is connected to the drive sprocket 72. When the sleeve 78 meshes with the clutch gear 80 while meshing with the differential case 66, the differential lock mechanism 52 places the transfer 24 in a center differential lock state in which the differential motion of the center differential 50 is limited.

The transfer 24 includes a shift actuator 82. The dog clutch mechanism 58 and the differential lock mechanism 52 are engaged when the shift actuator 82 is driven by the electronic control apparatus 90. In the dog clutch mechanism 58, when a first output member 84 of the shift actuator 82 is moved in an axial direction of the first output shaft 46, the sleeve 68 is actuated in its axial direction whereby the low gear position L or the high gear position H is selectively established. In the differential lock mechanism 52, when a second output member 86 of the shift actuator 82 is moved in the axial direction of the first output shaft 46, the sleeve 78 is moved in its axial direction whereby the engagement and disengagement are switched. The transfer 24 is placed in a center differential lock state by the engagement of the differential lock mechanism 52 whereby the center differential lock is turned ON. When the differential lock mechanism 52 is disengaged, the transfer 24 is placed in a center differential free state in which the differential motion of the center differential 50 is not limited, so that the center differential lock is turned OFF. The transfer 24 changes a speed of rotation of the input shaft 42 and transmits the rotation to the first output shaft 46 and the second output shaft 48 in a differential state or a directly connected state.

The vehicle 10 is a full-time all-wheel drive vehicle that can always run in an all-wheel drive state in which the power from the engine 12 is transmitted to the rear wheels 16 and the front wheels 14 via the transfer 24. The vehicle 10 has four wheels consisting of two front wheels 14 and two rear wheels 16, and thus is also a four wheel drive vehicle. In this embodiment, the all-wheel drive (=AWD) and the four wheel drive (=4WD) have the same meaning. Further, the vehicle 10 is an AWD vehicle capable of running in a non-differential state, i.e., in a locked state in which a rotational difference between the front wheels 14 and the rear wheels 16 is limited by engaging the differential lock mechanism 52 with the shift actuator 82.

Referring back to FIG. 1, the vehicle 10 includes the electronic control apparatus 90 as a controller including a control apparatus of the vehicle 10 related to control of the engine 12 and the like. The electronic control apparatus 90 includes a so-called microcomputer including a CPU, a RAM, a ROM and an input/output interface.

The electronic control apparatus 90 is supplied with various signals (such as an engine rotational speed Ne, an output rotational speed No, front wheel rotational speeds Nwfl, Nwfr, rear wheel rotational speeds Nwrl, Nwrr, a brake ON signal Bon, a brake operation amount Bra, a master-cylinder hydraulic pressure PRmc, an operation position POSop, an accelerator opening degree θacc, a differential lock selection signal Slock, a differential-lock selection signal DLon, a high-low switching operation signal OPhl, etc.) that are based on values detected by various sensors provided in the vehicle 10, wherein the sensors include an engine speed sensor 100, a rear-propeller-shaft speed sensor 102, wheel speed sensors 104, a brake sensor 106, a master-cylinder hydraulic pressure sensor 108, a shift position sensor 110, an accelerator opening sensor 112, a differential-lock detection switch 114, a center-differential-lock switch 116 and a dial position sensor 118.

The engine rotational speed Ne is a rotational speed of the engine 12. The output rotational speed No is the rotational speed of the rear propeller shaft 28, and is a signal corresponding to the vehicle running speed V. The front wheel rotational speeds Nwfl, Nwfr are rotational speeds of the respective front wheels 14 (14L, 14R). The rear wheel rotational speeds Nwrl, Nwrr are rotational speeds of the respective rear wheels 16 (16L, 16R). The brake ON signal Bon is a signal indicating a state in which a brake pedal 120 provided in the vehicle 10 is operated by a driver of the vehicle 10. The brake operation amount Bra is a signal indicating an amount of the brake operation by the vehicle driver. The master-cylinder hydraulic pressure PRmc is a hydraulic pressure generated by a master cylinder (not shown) that is included in a wheel brake device 128. The operation position POSop is a signal indicating an operation position of a shift lever 122 provided in the vehicle 10. The accelerator opening degree θ acc is a signal indicating an amount of an acceleration operation by the vehicle driver using an accelerator pedal 124 provided in the vehicle 10, and is an accelerator operation amount by the vehicle driver. The differential lock signal Slock is a signal indicating that switching to engagement of the differential lock mechanism 52 has been completed, and is a signal indicating a center differential lock state of the transfer 24. The differential-lock selection signal DLon is a signal indicating that the center-differential-lock switch 116 is turned ON, and is a signal indicating that switching of the transfer 24 to the center differential lock state is selected. The high-low switching operation signal OPhl is a signal indicating a dial position in which a gear-position switching dial 126 provided in the vehicle 10 is operated.

The shift lever 122 is a shift operation device that is to be operated by the vehicle driver to any one of a plurality of operation positions POSop. The operation positions POSop include P, R, N, and D operation positions corresponding to respective P, R, N, and D positions as a plurality of shift positions of the automatic transmission 22. The shift position of the automatic transmission 22 indicates a power transmission state in the automatic transmission 22. The shift lever 122 is a shift operation device for selecting the power transmission state of a power transmission device (such as the automatic transmission 22) provided between the engine 12 and the transfer 24.

The center-differential-lock switch 116 is, for example, a push-button switch with a latch, which is to be manually operated by the vehicle driver, and is a switch for selecting the differential state and the non-differential state of the center differential 50. For example, the center-differential-lock switch 116 outputs the differential-lock selection signal DLon when the switch 116 is turned ON and held in a pressed state. When the differential-lock selection signal DLon is outputted, the electronic control apparatus 90 causes the differential lock mechanism 52 to be engaged to switch the center differential 50 from the free state to the locked state.

The gear-position switching dial 126 is, for example, a dial-type switch that is to be manually operated by the vehicle driver, and has two dial positions, i.e., a High position for selecting switching to the high gear position H and a Low position for selecting switching to the low gear position L. The high-low switching operation signal OPhl indicates a position in which the gear-position switching dial 126 is operated. For example, when the gear-position switching dial 126 is placed in the High position, the gear-position switching dial 126 outputs the high-low switching operation signal OPhl corresponding to the High position. When the high-low switching operation signal OPhl corresponding to the High position is outputted, the electronic control apparatus 90 causes the synchronous meshing mechanism 60 to be engaged to place the auxiliary transmission 44 to the high gear position H. On the other hand, when the gear-position switching dial 126 is placed in the Low position, the gear-position switching dial 126 outputs the high-low switching operation signal OPhl corresponding to the Low position. When the high-low switching operation signal OPhl corresponding to the Low position is outputted, the electronic control apparatus 90 causes the dog clutch 64 to be engaged to place the auxiliary transmission 44 in the low gear position L.

In the vehicle 10, four types of running modes including a H4F running mode, a H4L running mode, a L4F running mode and a L4L running mode can be selected by operating the gear-position switching dial 126 and the center-differential-lock switch 116. The H4F running mode is a running mode that enables running in the center differential free state in the AWD state in which the high gear position H is established. The H4L running mode is a running mode that enables running in the center differential lock state in the AWD state in which the high gear position H is established. The L4F running mode is a running mode that enables running in the center differential free state in the AWD state in which the low gear position L is established. The L4L running mode is a running mode that enables running in the center differential lock state in the AWD state in which the low gear position L is established.

Various command signals (for example, an engine control command signal Se for controlling the engine 12, an AT control command signal Sat for controlling the automatic transmission 22, a high-low switching control command signal Shl for switching the gear position of the auxiliary transmission 44, a free-lock switching control command signal Sfl for switching the state of the center differential 50, and a brake control command signal Sbra for controlling the wheel brakes 130) are outputted from the electronic control apparatus 90 to various devices (for example, the engine 12, the automatic transmission 22, the shift actuator 82, and the wheel brake device 128) provided in the vehicle 10.

The wheel brake device 128 includes a brake master cylinder and a cylinder actuator (not shown) for generating a brake hydraulic pressure. Each of the wheels (including the front wheels 14 and the rear wheels 16) is provided with a wheel brake 130. The wheel brake device 128 supplies a brake hydraulic pressure to a wheel cylinder (not shown) provided in each of the wheel brakes 130. The wheel brake device 128 is a braking device that applies a wheel braking torque TBw, which is a braking torque generated by the wheel brake 130, to each of the wheels. The wheel brake device 128 normally supplies the master-cylinder hydraulic pressure PRmc having a magnitude corresponding to the brake operation amount Bra, to the wheel cylinder as the brake hydraulic pressure. In the wheel brake device 128, a brake characteristic in which the wheel braking torque TBw of the front wheels 14 is larger than the wheel braking torque TBw of the rear wheels 16 is set as a brake characteristic at a normal time.

In order to realize various controls in the vehicle 10, the electronic control apparatus 90 includes power-source control means in the form of a power-source control portion 92, transmission control means in the form of a transmission control portion 94 and running mode switching control means in the form of a running-mode switching control portion 96.

The power-source control portion 92 calculates a drive request amount for the vehicle 10 by the vehicle driver, by applying the accelerator opening degree θacc and the vehicle running speed V to a predetermined drive request amount map, for example. As the drive request amount, for example, a requested driving torque Trdem [Nm], a requested driving force Frdem [N] or the like in each wheel is used. The power-source control portion 92 outputs the engine-control command signal Se for controlling the engine 12 so as to realize the required driving torque Trdem.

The transmission control portion 94 makes a determination as to whether a shifting action is to be executed or not in the automatic transmission 22. The transmission control portion 94 makes the determination, for example, by using a predetermined shift map, and outputs the AT-control command signal Sat for executing the shifting action in the automatic transmission 22, when determining that the shifting action is to be executed in the automatic transmission 22.

The running-mode switching control portion 96 controls switching of the running mode based on the high-low switching operation signal OPhl of the gear-position switching dial 126 and the differential-lock selection signal DLon of the center-differential-lock switch 116.

When the high-low switching operation signal OPhl is a signal corresponding to the High position, the running-mode switching control portion 96 outputs the high-low switching control command signal Shl for placing the auxiliary transmission 44 in the high gear position H. On the other hand, when the high-low switching operation signal OPhl is a signal corresponding to the Low position, the running-mode switching control portion 96 outputs the high-low switching control command signal Shl for placing the auxiliary transmission 44 in the low gear position L.

When receiving the differential-lock selection signal DLon, the running-mode switching control portion 96 outputs the free-lock switching control command signal Sfl for switching the center differential 50 to the locked state. On the other hand, when not receiving the differential-lock selection signal DLon, the running-mode switching control portion 96 outputs the free-lock switching control command signal Sfl for switching the center differential 50 to the free state.

By the way, when the vehicle 10 is going to run on a steep uphill road, the vehicle 10 could be moved backward unless the brake pedal 120 is depressed except when the accelerator is ON. Similarly, in a case where only a right foot of the vehicle driver is used when the vehicle 10 is restarted after having been stopped on an uphill road, if the accelerator pedal 124 is depressed after the brake pedal 120 is released, the vehicle 10 is likely to be moved backward. Therefore, when the vehicle 10 is restarted after having been stopped on an uphill road, it is conceivable that the accelerator pedal 124 is depressed with the right foot while the brake pedal 120 is depressed with a left foot of the vehicle driver. In this case, simultaneous depressions of the brake pedal 120 and the accelerator pedal 124 occurs. In this situation, when the transfer 24 is in the center differential lock state with a road surface being in a condition in which the wheels or the rear wheels 16 are slippery, the driving torque Tr of the rear wheels 16 becomes larger than the wheel braking torque TBw of the rear wheels 16, so that there is a possibility that the rear wheels 16 slightly slip. Then, since the transfer 24 is in the center differential lock state, a torque transmitted to the power transmission path to the front wheels 14 is likely to be higher than a torque transmitted to the power transmission path to the rear wheels 16, so that a durability of the power transmission path to the front wheels 14 could be reduced. Such a phenomenon is remarkable in the L4L running mode in which the drive torque Tr is increased, and also occurs when the vehicle runs on a road surface such as a rough road. On the other hand, if the engine torque Te is uniformly limited in the L4L running mode, there is a possibility that the drive torque Tr required for running of the vehicle 10 on an uphill road, a rough road or the like cannot be ensured.

Therefore, the electronic control apparatus 90 executes a torque limiting control CTtl for limiting the engine torque Te with respect to the wheel braking torque TBw of the rear wheels 16, to an upper limit of the drive torque Tr that does not cause the rear wheels 16 to slip. Thus, for example, when the vehicle is restarted on an uphill road, if the brake pedal 120 is gradually released and the accelerator pedal 124 is gradually depressed from a state of the simultaneous depressions of the brake pedal 120 and the accelerator pedal 124, the limitation of the engine torque Te is gradually released in accordance with the reduction in the wheel braking torque TBw. Therefore, it is possible to easily eliminate both a concern that the durability of the power transmission path to the front wheels 14 is reduced and another concern that the drive torque Tr cannot be ensured.

For performing the torque limiting control CTtl, the electronic control apparatus 90 further includes state determination means in the form of a state determination portion 98.

The state determination portion 98 determines whether or not the transfer 24 is in a differential limiting state, that is, whether or not the transfer 24 is in the center differential lock state. The state determination portion 98 determines whether or not the transfer 24 is in the center differential lock state, for example, depending on whether or not the differential-lock selection signal DLon is outputted. Whether or not the differential-lock selection signal DLon is outputted has the same meaning as whether or not the center differential lock is turned ON.

The state determination portion 98 determines whether or not the wheel braking torque TBw is applied to each of the front wheels 14 and the rear wheels 16. The state determination portion 98 determines whether or not the wheel braking torque TBw is applied to each of the front wheels 14 and the rear wheels 16, for example, depending on whether or not the brake ON signal Bon is outputted. Whether or not the brake ON signal Bon is outputted has the same meaning as whether or not the brake pedal 120 is turned ON.

The power-source control portion 92 executes the torque limiting control CTtl when the state determination portion 98 determines that the transfer 24 is in the differential limiting state and that the wheel braking torque TBw is applied to each of the front wheels 14 and the rear wheels 16.

In the torque limiting control CTtl, the power-source control portion 92 sets an engine-torque upper limit value Teul to a smaller value when the wheel braking torque TBw is large than when the wheel braking torque TBw is small. The engine-torque upper limit value Teul is an upper limit value of the engine torque Te. The power-source control portion 92 uses the master-cylinder hydraulic pressure PRmc as a signal representing the wheel braking torque TBw.

Figure 3:
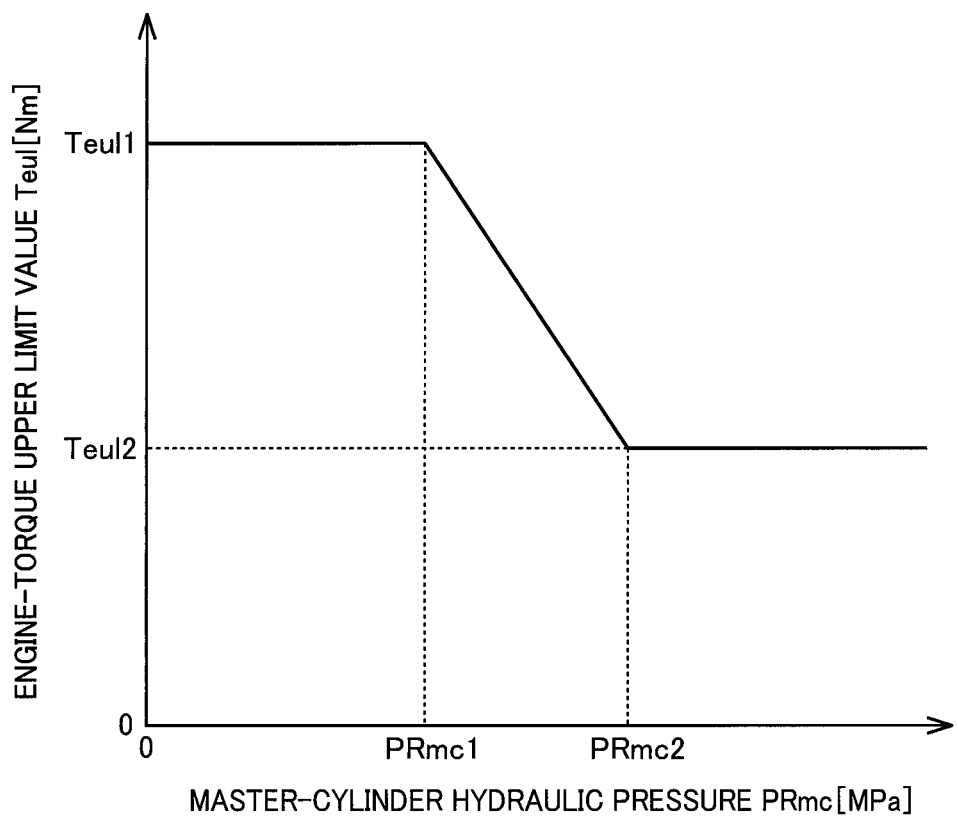
FIG. 3 is a view showing an example of an engine-torque upper limit value predetermined depending on a master-cylinder hydraulic pressure.

FIG. 3 is a view showing an example of the engine-torque upper limit value Teul predetermined depending on the master-cylinder hydraulic pressure PRmc. As shown in FIG. 3, the engine-torque upper limit value Teul is set to a first engine-torque upper limit value Teul1 when the master-cylinder hydraulic pressure PRmc is in a range not higher than a first master-cylinder hydraulic pressure PRmc1. The first engine-torque upper limit value Teul1 is, for example, the engine-torque upper limit value Teul set by a requirement different from that of the torque limiting control CTtl. That is, in a region in which the master-cylinder hydraulic pressure PRmc is not higher than the first master-cylinder hydraulic pressure PRmc1, the engine torque Te is not substantially limited. In a region in which the master-cylinder hydraulic pressure PRmc is gradually increased from the first master-cylinder hydraulic pressure PRmc1, the engine-torque upper limit value Teul is gradually reduced from the first engine-torque upper limit value Teul1. That is, the engine torque Te is limited when the master-cylinder hydraulic pressure PRmc is higher than the first master-cylinder hydraulic pressure PRmc1. For example, the engine-torque upper limit value Teul is set such that the drive torque Tr does not cause the rear wheels 16 to slip with respect to the wheel braking torque TBw of the rear wheels 16. In a region in which the master-cylinder hydraulic pressure PRmc is not lower than a second master-cylinder hydraulic pressure PRmc2, the engine-torque upper limit value Teul is set to a second engine-torque upper limit value Teul2. The second master-cylinder hydraulic pressure PRmc2 is set to, for example, a pressure value that moderates an increase in the wheel braking torque TBw of the rear wheels 16 with respect to an increase in the master-cylinder hydraulic pressure PRmc. The second engine-torque upper limit value Teul2 is set to, for example, a torque value that ensures the durability of the power transmission path to the front wheels 14 and also ensures a sufficient value of the drive torque Tr for driving the vehicle 10.

The state determination portion 98 determines whether or not a lowest gear position, i.e., the low gear position L is established in the auxiliary transmission 44. The state determination portion 98 determines whether or not the auxiliary transmission 44 is placed in the low gear position L, for example, based on the high-low switching control command signal Shl. Whether or not the auxiliary transmission 44 is placed in the low gear position L has the same meaning as whether or not the transfer 24 is in a L4 state representing the AWD state in the low gear position L.

The power-source control portion 92 executes the torque limiting control CTtl when the state determination portion 98 determines that the transfer 24 is in the differential limiting state, that the wheel braking torque TBw is applied to each of the front wheels 14 and the rear wheels 16 and that the auxiliary transmission 44 is in the low gear position L.

The state determination portion 98 determines whether or not the vehicle running speed V is equal to or lower than a predetermined speed value Vf. The predetermined speed value Vf is, for example, a predetermined threshold value for determining whether the vehicle is stopped or running at a low speed. The running at the low speed running is, for example, running at a speed V that is about a speed at which a person walks. Alternatively, the predetermined speed value Vf may be set in consideration of the vehicle running speed V due to idling of the wheels on a rough road or the like.

The power-source control portion 92 executes the torque limiting control CTtl when the state determination portion 98 determines that the transfer 24 is in the differential limiting state, that the wheel braking torque TBw is applied to each of the front wheels 14 and the rear wheels 16, and that the vehicle running speed V is equal to or lower than the predetermined speed value Vf.

The state determination portion 98 determines whether or not the operation position POSop at the operation position of the shift lever 122 is the D operation position or the R operation position. The D operation position is a forward run operation position for selecting the D position of the automatic transmission 22. The D position is a forward run position that enables the vehicle 10 to run forward. That is, the D operation position is an operation position for selecting a power transmission state that enables forward running of the vehicle 10. The R operation position is a reverse run operation position for selecting the R position of the automatic transmission 22. The R position is a reverse running position at which the vehicle 10 can run reversely. That is, the R operation position is an operation position for selecting a power transmission state that enables reverse running of the vehicle 10.

The power source control portion 92 executes the torque limiting control CTtl when the state determination portion 98 determines that the transfer 24 is in the limited-slip differential state, that the wheel braking torque TBw is applied to each of the front wheels 14 and the rear wheels 16, and that the operation position POSop is the D operation position or the R operation position.

The state determination portion 98 determines whether a lowest forward gear position or a reverse gear position is established in the automatic transmission 22. Where the automatic transmission 22 is a step-variable transmission, whether the lowest forward gear position or the reverse gear position is established in the automatic transmission 22 has the same meaning as whether or not the automatic transmission 22 is placed in the first speed gear position 1st or the reverse gear position Rev.

The power-source control portion 92 executes the torque limiting control CTtl when the state determination portion 98 determines that the transfer 24 is in the limited slip differential state, that the wheel braking torque TBw is applied to each of the front wheels 14 and the rear wheels 16, and that the lowest forward gear position or the reverse gear position is established in the automatic transmission 22.

Figure 4:
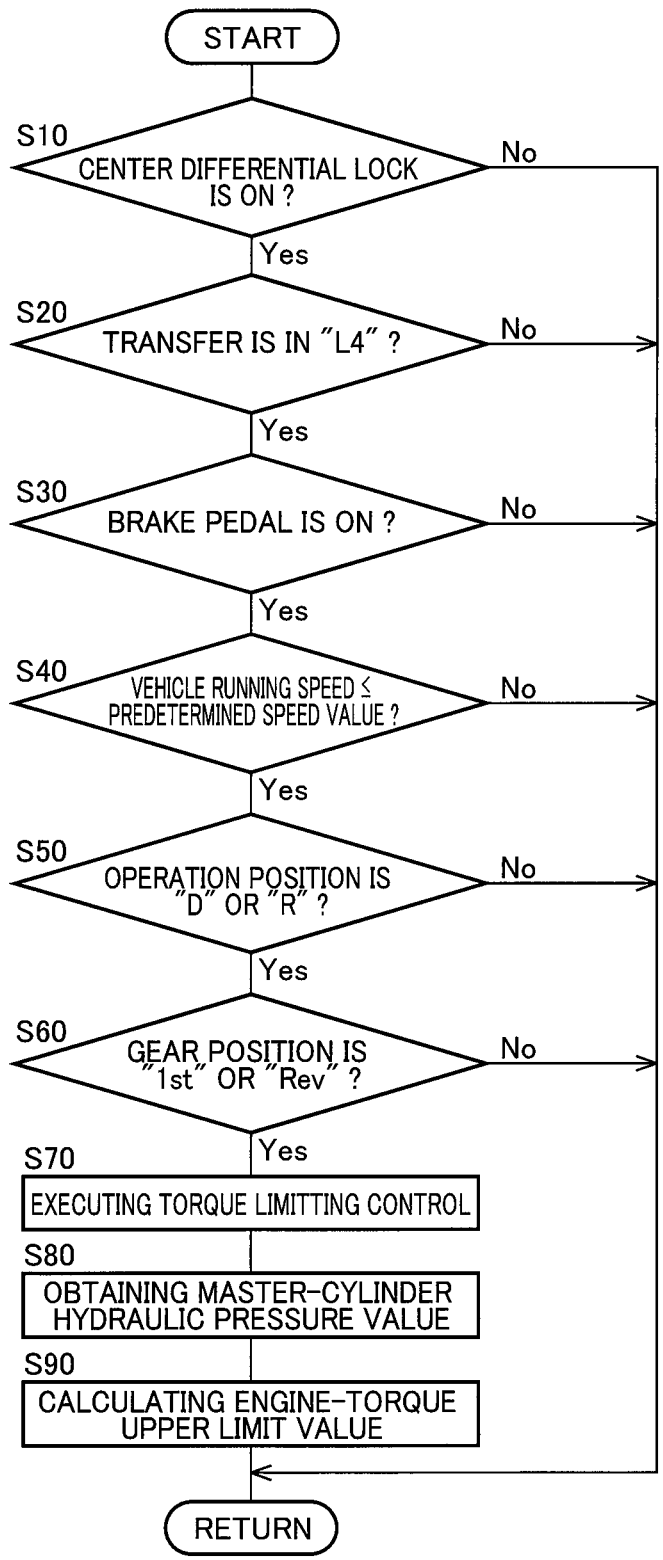
FIG. 4 is a flowchart showing a main part of a control operation executed by an electronic control apparatus, for suppressing a reduction in durability of a power transmission path to front wheels while securing a power performance in a differential limiting state of a transfer.

FIG. 4 is a flowchart showing a main part of a control operation of the electronic control apparatus 90, and is a flowchart showing a control routine that is executed for suppressing a reduction in durability of the power transmission path to the front wheels 14 while securing power performance in the differential limiting state of the transfer 24. This control routine is repeatedly executed, for example.

As shown in FIG. 4, the control routine is initiated with step S10 corresponding to function of the state determination portion 98, which is implemented to determine whether or not the center differential lock is turned ON. When an affirmative determination (YES) is made at step S10, step S20 corresponding to function of the state determination portion 98 is implemented to determine whether or not the transfer 24 is in the L4 state. When an affirmative determination is made at step S20, step S30 corresponding to function of the state determination portion 98 is implemented to determine whether or not the brake pedal 120 is turned ON. When an affirmative determination is made at step S30, step S40 corresponding to function of the state determination portion 98 is implemented to determine whether or not the vehicle running speed V is equal to or lower than the predetermined speed value Vf. When an affirmative determination is made at step S40, step S50 corresponding to function of the state determination portion 98 is implemented to determine whether or not the operation position POSop is the D operation position or the R operation position. When an affirmative determination is made at step S50, step S60 corresponding to function of the state determination portion 98 is implemented to determine whether or not the automatic transmission 22 is placed in the first speed gear position 1st or the reverse gear position Rev. When an affirmative determination is made at step S60, step S70 corresponding to function of the power source control portion 92 is implemented whereby an execution flag of the torque limiting control CTtl is turned ON. Next, step S80 corresponding to the function of the power source control portion 92 is implemented to obtain the master-cylinder hydraulic pressure PRmc. Next, step S90 corresponding to the function of power source control portion 92 is implemented to calculate the engine-torque upper limit value Teul based on the master-cylinder hydraulic pressure PRmc (see FIG. 3). In a case in which a negative determination is made at any one of steps S10, S20, S30, S40, S50 and S60, one cycle of execution of the control routine is terminated.

As described above, according to the present embodiment, when the transfer 24 is in the differential limiting state and the wheel braking torque TBw is applied to each of the front wheels 14 and the rear wheels 16, the torque limiting control CTtl is executed. Thus, for example, in a case in which a large accelerator operation and a large brake operation are executed in the differential limiting state of the transfer 24, the engine torque Te is likely to be limited, so that high torque is unlikely to be transmitted to the power transmission path to the front wheels 14. Further, for example, in the differential limiting state of the transfer 24, when the accelerator operation is gradually increased while the brake operation is gradually reduced, the limitation of the engine torque Te is gradually released, so that the engine torque Te is increased in a state in which the rear wheels 16 are unlikely to slightly slip. Therefore, in the differential limiting state of the transfer 24, it is possible to suppress a reduction in durability of the power transmission path to the front wheels 14 while ensuring the power performance.

According to the present embodiment, when the auxiliary transmission 44 is placed in the low gear position L, the torque limiting control CTtl is executed. Further, when the vehicle running speed V is equal to or lower than the predetermined speed value Vf, the torque limiting control CTtl is executed. Further, when the operation position POSop is the D operation position or the R operation position, the torque limiting control CTtl is executed. Further, when the automatic transmission 22 is placed in the first speed gear position 1st or the reverse gear position Rev, the torque limiting control CTtl is executed. As a result, the torque limiting control CTtl is executed in a situation in which a phenomenon of reduction in the durability of the power transmission path to the front wheels 14 is likely to occur. Therefore, it is possible to suppress the reduction in the durability of the power transmission path to the front wheels 14.

Although the embodiment of the present invention has been described in detail with reference to the drawings, the present invention is also applicable to other embodiments.

For example, in the above-described embodiment, the automatic transmission 22 does not necessarily have to be the planetary gear type automatic transmission, but may be a synchronous-meshing parallel-two-shaft automatic transmission including a known DCT (Dual Clutch Transmission) and a known belt-type continuously variable transmission, for example.

Further, in the above-described embodiment, the power source of the vehicle 10 does not necessarily have to be the engine 12, but may be at least one of an engine and an electric motor.

In the above-described embodiment, in the torque limiting control CTtl, the engine torque Te may be limited by controlling a command value of the engine torque Te, or by controlling a command value of the input torque of the automatic transmission 22 or the output torque of the torque converter 20. In short, it is sufficient that the drive torque Tr can be limited.

In the above-described embodiment, the engine-torque upper limit value Teul is set based on the master-cylinder hydraulic pressure PRmc, but the invention is not limited to this mode. The master-cylinder hydraulic pressure PRmc is used merely because a value representing the magnitude of the wheel braking torque TBw is required for setting the engine torque upper limit value Teul. Therefore, any value other than the master-cylinder hydraulic pressure PRmc may be used as long as it represents the magnitude of the wheel braking torque TBw.

Further, in the above-described embodiment, the AWD vehicle does not necessarily have to be a full-time AWD vehicle, but may be an AWD vehicle capable of switching between AWD and front-wheel drive or rear-wheel drive. In short, the present invention can be applied to any AWD vehicle capable of running with the center differential lock state being established in the AWD state.

It should be noted that the above-described embodiment is merely one embodiment, and the present invention can be embodied in a mode in which various changes and improvements are added based on the knowledge of those skilled in the art.

NOMENCLATURE OF ELEMENTS

10: vehicle (all-wheel drive vehicle)
12: engine (power source)
14 (14L, 14R): front wheel
16 (16L, 16R): rear wheel
22: automatic transmission (transmission, power transmission device)
24: transfer (power distribution device)
44: auxiliary transmission (step-variable transmission)
52: differential lock mechanism (differential limiting mechanism)
90: electronic control apparatus (control apparatus)
122: shift lever (shift operation device)
132: wheel brake device (braking device)

What is claimed is:

1. A control apparatus for an all-wheel drive vehicle that includes (i) front wheels, (ii) rear wheels, (iii) a power source, (iv) a power distribution device configured to distribute a power from the power source to the front wheels and the rear wheels, (v) a differential limiting mechanism configured to place the power distribution device in a differential limiting state in which a rotational difference between the front wheels and the rear wheels is limited, and (vi) a braking device configured to apply a wheel braking torque to each of the front wheels and the rear wheels, the control apparatus comprising:
    circuitry configured to, when the power distribution device is placed in the differential limiting state and the wheel braking torque is applied to each of the front wheels and the rear wheels, execute a torque limiting control for setting an upper limit value of a torque of the power source to a smaller value when the wheel braking torque is large than when the wheel braking torque is small.

2. The control apparatus according to claim 1,
    wherein the power distribution device is provided with a step-variable transmission configured to transmit the power from the power source to the front wheels and the rear wheels while changing a rotational speed of the power source, and
    wherein the circuitry is configured to execute the torque limiting control when a lowest gear position is established in the step-variable transmission.

3. The control apparatus according to claim 1, circuitry is configured to execute the torque limiting control when a running speed of the vehicle is not higher than a predetermined speed value.

4. The control apparatus according to claim 1,
    wherein the vehicle further includes:
        a power transmission device provided between the power source and the power distribution device, and
        a shift operation device that is to be operated to switch between power transmission states of the power transmission device, and
    wherein the circuitry is configured to execute the torque limiting control when the shift operation device is operated to select one of the power transmission states of the power transmission device that enables forward running of the vehicle or another one of the power transmission states of the power transmission device that enables reverse running of the vehicle.

5. The control apparatus according to claim 1,
    wherein the vehicle further includes a transmission provided between the power source and the power distribution device, and
    wherein the circuitry is configured to execute the torque limiting control when a lowest forward gear position or a reverse gear position is established in the transmission.

* * * * *